United States Patent
Hoch

(10) Patent No.: US 6,850,250 B2
(45) Date of Patent: Feb. 1, 2005

(54) METHOD AND APPARATUS FOR A DECLARATIVE REPRESENTATION OF DISTORTION CORRECTION FOR ADD-ON GRAPHICS IN BROADCAST VIDEO

(75) Inventor: Michael Hoch, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 416 days.

(21) Appl. No.: 09/942,251

(22) Filed: Aug. 28, 2001

(65) Prior Publication Data

US 2002/0070952 A1 Jun. 13, 2002

Related U.S. Application Data

(60) Provisional application No. 60/311,301, filed on Aug. 10, 2001, and provisional application No. 60/228,943, filed on Aug. 29, 2000.

(51) Int. Cl.[7] ..................... G09G 5/3777; H04N 5/272
(52) U.S. Cl. ..................... 345/632; 345/647; 348/589
(58) Field of Search ..................... 345/632, 633, 345/647; 348/239, 589

(56) References Cited

U.S. PATENT DOCUMENTS 4,970,666 A * 11/1990 Welsh et al. ................. 345/423
5,457,370 A * 10/1995 Edwards ...................... 318/571
5,878,174 A *  3/1999 Stewart et al. ............. 382/293

* cited by examiner

Primary Examiner—Jeffery Brier
(74) Attorney, Agent, or Firm—Haverstock & Owens LLP

(57) ABSTRACT

An apparatus and a method for distorting add-on graphics to be composited with a streaming video feed comprising, receiving a streaming video feed captured using a real camera, said streaming video feed including an image frame taken from a particular view point and a particular field of view, said real camera introducing image distortions into the image frame, measuring a plurality of camera instrumentation data corresponding to at least said view point, said field of view, and a distortion parameters corresponding to the image distortions of the image frame, creating a virtual camera, setting the virtual view point and the virtual field of view of the virtual camera using the plurality of camera instrumentation data, generating add-on graphics having a size and an insertion position within the image frame based on the virtual camera, creating a distortion grid, distorting the add-on graphics to match the image distortions of the image frame, and compositing the distorted add-on graphics with the image frame of the streaming video feed.

79 Claims, 10 Drawing Sheets

METHOD AND APPARATUS FOR A DECLARATIVE REPRESENTATION OF DISTORTION CORRECTION FOR ADD-ON GRAPHICS IN BROADCAST VIDEO

CROSS REFERENCE TO RELATED APPLICATIONS

The present application claims priority from the U.S. provisional application No. 60/228,943 entitled "A DECLARATIVE REPRESENTATION OF DISTORTION CORRECTION FOR ADD-ON GRAPHICS IN BROADCAST VIDEO" filed Aug. 29, 2000, and application No. 60/311,301, entitled "METHOD AND APPARATUS FOR DISTORTION CORRECTION AND DISPLAYING ADD-ON GRAPHICS FOR REAL TIME GRAPHICS" filed Aug. 10, 2001, by the same inventor, which is herein incorporated by reference.

FIELD OF THE INVENTION

The present invention relates generally to audio/visual graphics production techniques, and more particularly to an apparatus and method capable of inserting graphics registered to streaming video broadcast and correcting for the effects of radial lens distortions and optical center shift of the real camera.

BACKGROUND OF THE INVENTION

Digital television broadcasts now reach tens of millions of receivers worldwide. The current generation of Digital Television (DTV) receivers, primarily cable and satellite set-top-boxes (STB), generally offer limited resources to applications. The next generation of DTV receivers will be more flexible for application development. Receivers are becoming more powerful through the use of faster processors, larger memory, 3D graphics hardware and disk storage.

Broadcasters distribute monolithic video programming, in which all of the presentation graphics, transitions, and special effects have been pre-composited in the studio or post-production suite to form a single video stream. This monolithic video presentation is well suited to the uniform broadcast of traditional narrative TV shows but may not be adequate programming for the newly emerging interactive DTV technology.

Several broadcasters have developed systems capable of inserting registered graphics into live video. These systems are typically targeted towards sports broadcasts and use a combination of camera tracking and object tracking technologies. For example, using positional data obtained from IR transmitters in hockey pucks, visual enhancements such as glows or streaks can be rendered where the hockey puck appears in the video frame. More recently, another broadcaster has developed a system for rendering a virtual "$1^{st}$ and 10" line now used in many NFL broadcasts. Another form of graphics enhancement, also targeted towards sports broadcasts, is the insertion of images (typically advertising logos) registered to physical surfaces at the event site (e.g., the playing field, existing billboards).

However, as broadcasters consider bringing viewer interaction to the TV, it becomes clear that something beyond the existing "burned onto videotape" content model is needed. One contemporary approach is to transmit and layer "web graphic" overlays on top of the monolithic video signal. Unfortunately, the results usually ends up looking more like a computer monitor than a TV show, failing to live up to the full-motion video experience familiar to a life-long television audience.

Emerging digital media standards like Advanced Television Standard Committee (ATSC) provide the means of transmitting the necessary data streams to consumer platforms. There is a need for a new approach to the emerging new medium of interactive television by employing a more integral, content-driven analysis, the goal of which is to produce interactive content that delivers and extends the rich media aesthetics of the existing television content, while leveraging the late-composition advantages of web-based delivery.

SUMMARY OF THE PRESENT INVENTION

Briefly, one aspect of the present invention is embodied in a method of distorting add-on graphics to be composited with a streaming video feed comprising, receiving a streaming video feed captured using a real camera, said streaming video feed including an image frame taken from a particular view point and a particular field of view, said real camera introducing image distortions into the image frame, measuring a plurality of camera instrumentation data corresponding to at least said view point, said field of view, and a distortion parameters corresponding to the image distortions of the image frame, creating a virtual camera, setting the virtual view point and the virtual field of view of the virtual camera using the plurality of camera instrumentation data, generating add-on graphics having a size and an insertion position within the image frame based on the virtual camera, creating a distortion grid, distorting the add-on graphics to match the image distortions of the image frame, and compositing the distorted add-on graphics with the image frame of the streaming video feed.

The advantages of the present invention will become apparent to those skilled in the art upon a reading of the following descriptions and study of the various figures of the drawings.

DETAILED DESCRIPTION OF THE PREFERRED EMBODIMENT

Figure 1:
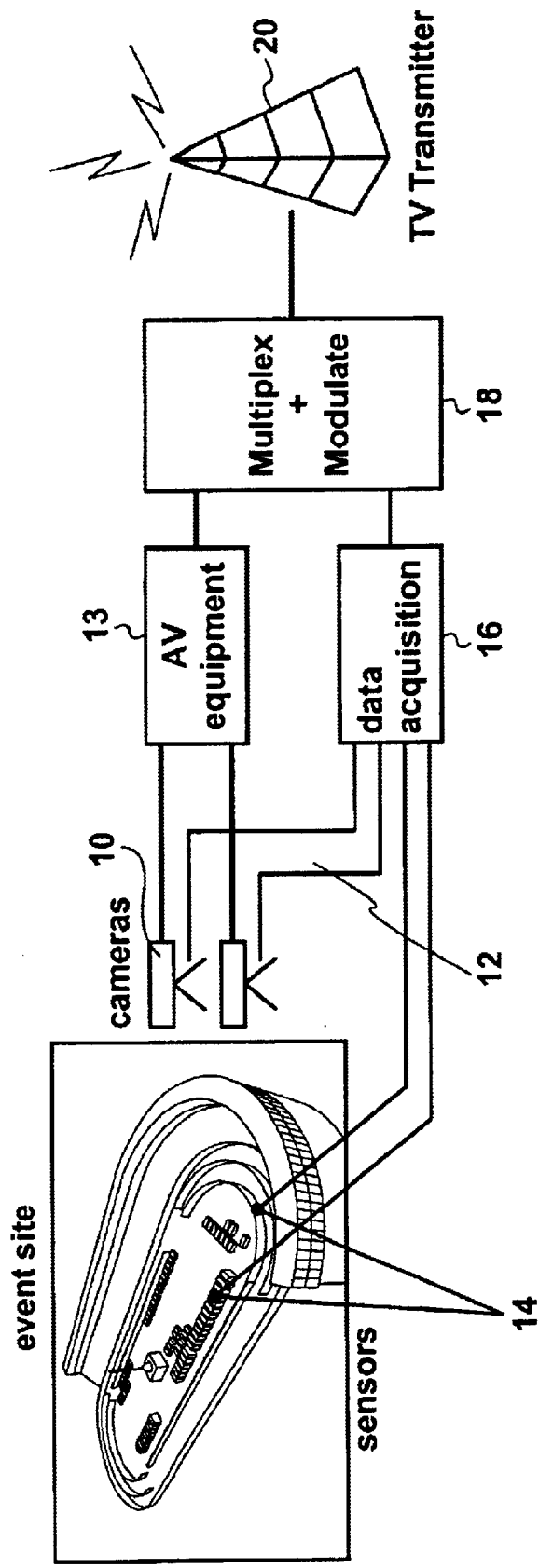
FIG. 1 illustrates a data acquisition and transmission system for a typical Digital Television system.

FIG. 1 illustrates a data acquisition and transmission system for a typical Digital Television system. In this illustrative example, the Audio Video (AV) elementary stream of a car racing event is captured by many cameras 10 at the event site 11, and is fed to the AV equipment 13. The AV equipment 13 preprocess the incoming live video feed and present it to the multiplexing and modulating module represented by block 18, for further processing. Camera Instrumentation data 12 is also collected for each camera and input to the data acquisition unit 16. Concurrently, sensors 14 collect performance and tracking data on the real assets within the video feed. In a car racing event such as the one illustrated in the present example, each race car may also be tracked using a Global Positioning Satellite (GPS system) and the positional data on the individual cars 14 is fed to the data acquisition unit 16. Individual cars performance data such as the RPM or speed of each race car may also be collected and integrated in the data feed by inputting the data into the data acquisition unit 16. Thus the data collected in the data acquisition module 16 includes positional and instrumentation data 12 of each of the cameras 10 covering the race, as well as positional and instrumentation data 14 on the each race car. The AV signal and the corresponding data are multiplexed and modulated by modules in block 18 and transmitted via a TV signal transmitter 20.

Figure 2:
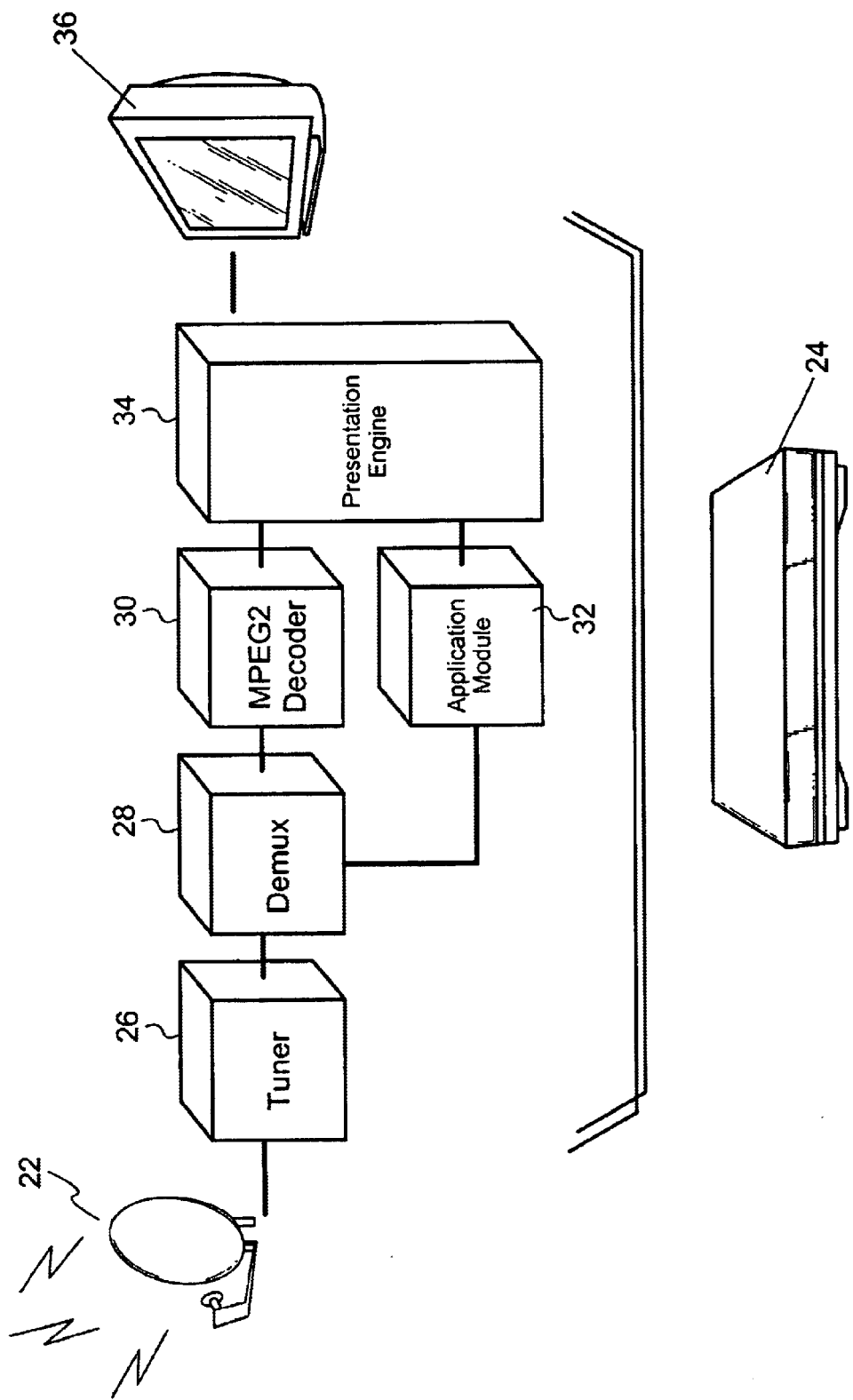
FIG. 2 illustrates the receiver of a digital television transmission and reception system as disclosed by the present invention.

FIG. 2 is a block diagram for one embodiment of the receiver for a digital television transmission and reception system. The digital television signals may be delivered via cable or satellite or terrestrial broadcast as represented by the receiving antenna 22. In one embodiment, the receiving antenna delivers the signals to a Set Top Box (STB) 24. Alternatively, the transmitted signal may be received and processed by separate units such as a digital receiver operating in conjunction with a gaming platform or gaming engine. As disclosed in the preferred embodiment of the present invention, the STB 24, includes a tuner 26, a demultiplexer (Demux) 28 to demultiplex the incoming signal, a MPEG-2 Decoder 30 to decode the incoming signal, an application module 32, and a presentation engine 34. The application module 32 may interface with a gaming platform not shown here. Alternatively, the application module 32 may be incorporated into a single unit along with the presentation engine 34. The presentation engine 34 processes the incoming AV signals and the corresponding data, and renders a composite image on the digital television 36.

Figure 3:
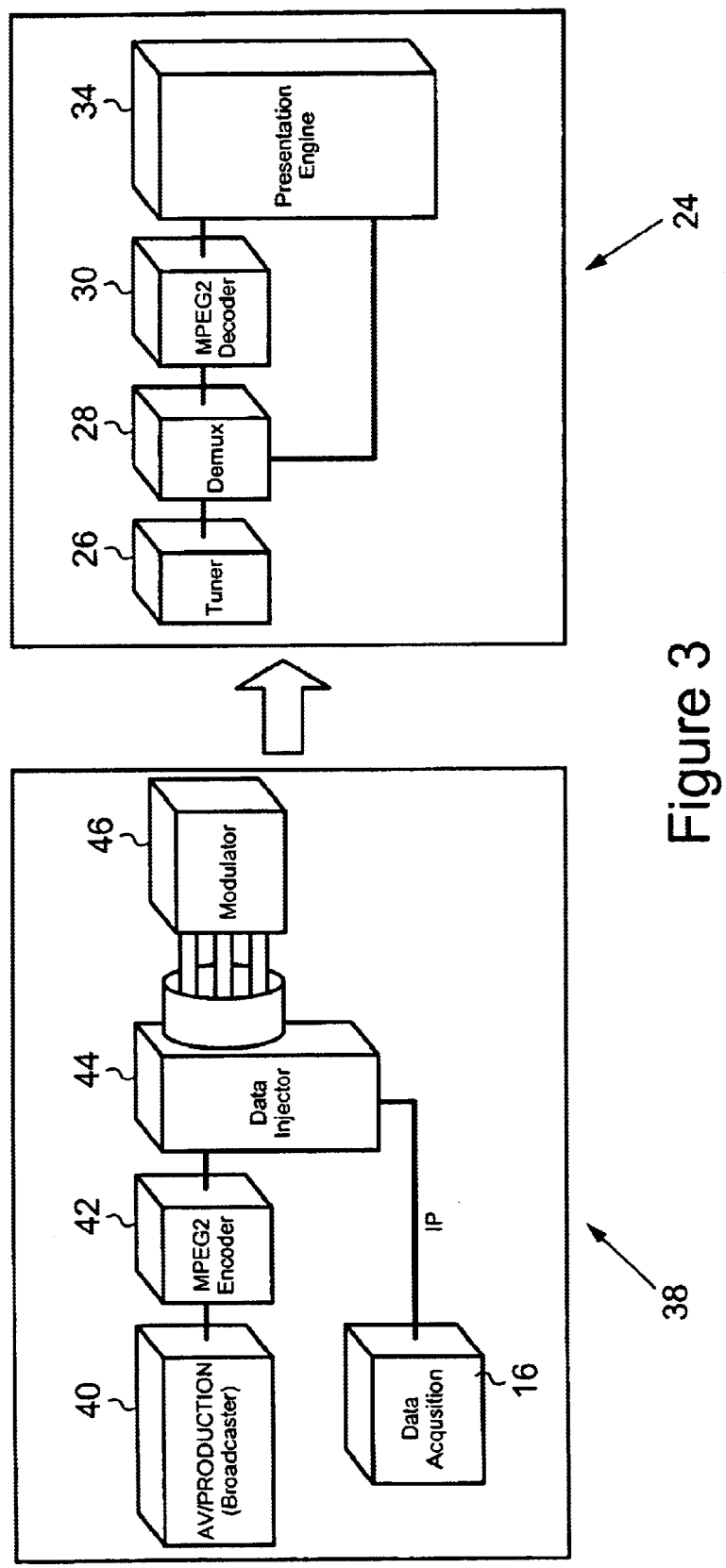
FIG. 3 illustrates the functional block diagram for a transmission and reception systems for a Digital Television (DTV) system.

FIG. 3 shows the functional block diagram for a transmission and reception systems for a Digital Television (DTV). The DTV production system 38 is composed of AV Production module 40 corresponding to the television cameras 10 and the AV equipment 13 of FIG. 1. The AV signals from the AV production unit 40 (broadcaster) are fed into an MPEG-2 encoder 42, which compresses the AV data based on an MPEG-2 standard. Digital television broadcast services, whether satellite, cable or terrestrial transmission are based on the MPEG-2 standard. In addition to specifying audio and video encoding, MPEG-2 defines a transport stream format consisting of a multiplex of elementary streams. The elementary streams can contain compressed audio or video content, program specific information describing the structure of the transport stream, and arbitrary data. It will be appreciated by one skilled in the art that the teachings of the present invention are not limited to an implementation based on an MPEG-2 standard. Alternatively, the present invention may be implemented using any standard such as MPEG-4, DSM-CC or the Advanced Television System Committee (ATSC) data broadcast standard that allows for ways of placing Internet Protocol based or IP datagrams in elementary streams. The generated and compressed AV data is input into a data injector 44, which combines the AV signals with the corresponding instrumentation data coming from the data acquisition unit 16. The data acquisition module 16 handles the various real-time data sources made available to the broadcaster. In the example used with the present embodiment, the data acquisition module 16 obtains the camera tracking, car tracking, car telemetry and standings data feeds and converts these into Internet Protocol (IP) based packets which are then sent to the data injector 44. The data injector 44 receives the IP packets and encapsulates them in an elementary stream that is multiplexed with the AV elementary streams. The resulting transport stream is then modulated by the modulator 46, and transmitted to the receiver device via cable, satellite or terrestrial broadcast.

On the receiver side, a STB receiver 24 receives the transmitted combined AV/data signal. The functions performed on the receiver side were previously described in FIG. 2. Alternatively, the STB receiver 24 may be incorporated into a Digital television or a Personal Computer with a DTV card. Furthermore, the presentation engine 34 may include an integrated application module 32 or use a stand alone application module 32 to interface with a gaming engine as shown in FIG. 2.

Figure 4:
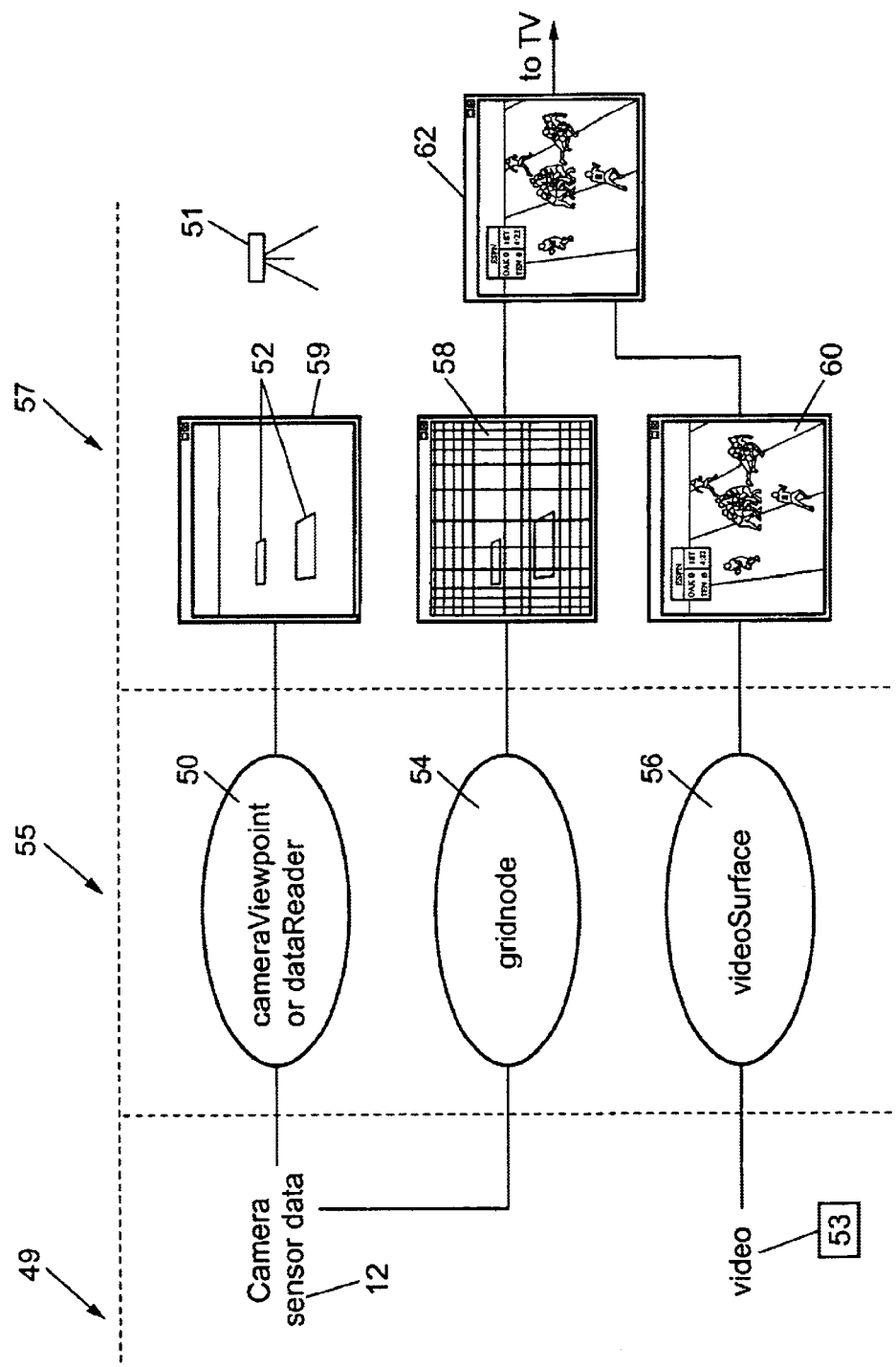
FIG. 4 illustrates a data flow diagram of the data stream processing on the receiver side.

FIG. 4 is a flow diagram of one embodiment of the data stream as it is processed on the receiver side. The combined video and data stream generated by the cameras 10 and sensors 14 at the event site 11 is processed at the receiver input stage 49.

In the processing stage 55, the camera sensor data 12 and the instrumentation data corresponding to the real asset in the broadcasted video feed is processed using a declarative markup language such as Virtual Reality Markup Language (VRML). It would be appreciated by one skilled in the art that the method and apparatus of the present invention may be implemented using other means of declarative representation languages. However, VRML is a web-oriented declarative markup language well suited for 2D/3D graphics generation. In the present example of the present invention, VRML is selected as the platform used to implement the teachings of the present invention.

At the output stage 57, the camera sensor data as well as asset tracking data are used to render add-on graphics of the appropriate size and at the appropriate position, composited with the broadcast video and registered to the real assets in the streaming video feed.

Prior to entering the input stage 49 of the presentation engine 34, the video feed 53 generated by the cameras 10 at the event site 11 and the corresponding camera instrumentation data 12 are received and tuned by the tuner module 26, demultiplexed by the demux module 28 and decoded by the MPEG-2 decoder module 30 as described previously in FIG. 3.

In one embodiment, after demultiplexing and decoding of the video feed 53 and the camera instrumentation data 12, at the input stage 49 of the presentation engine 34, appropriate parameters are collected and corresponding values are passed to the gridnode node and the camera Viewpoint node or alternatively to the dataReader and viewpoint nodes. The AV video feed 53 is inputted to the videoSurface node 56.

In a declarative markup language such as the VRML, nodes describe shapes and their properties in the "world" being rendered. Individual nodes describe shapes, colors, lights, viewpoints, how to orient shapes, animation timers, sensors interpolators and so on. Nodes generally contain the node type, and a set of fields. Fields define the attributes of a node such as height, and color of the object to be rendered. Enhancements that are registered to real assets within a video feed require placement that is correlated with objects in the video.

Current camera and object tracking systems provide the data required for accurate graphical insertions of add-on graphics registered to the content of the video feed. In one embodiment, nodes have been developed that include data fields for accepting camera instrumentation data allowing a declarative representation of the parameters used in rendering camera-aligned overlay graphics or add-on graphics. The camera tracking equipment may use encoders to read parameters such as the current pan, tilt and twist of the camera as well as the zoom level (camera tracking data 12) corresponding to a particular frame of the streaming video feed 53. Additionally, if the real camera is mobile, GPS tracking may be used to supply data on the physical location of the real camera at each point in time. The add-on graphics are rendered at the appropriate position and size using a virtual camera 51, and thereafter composited with the real scene.

Geometric correction that accounts for lens distortion and optical center shift is often not applied due to the increased processing cost. The correction becomes necessary if graphical insertion of objects that are aligned with the content of the video feed 53 is desired. This correction becomes especially important if one has, for example, real objects sitting on virtual objects. Without lens distortion correction, real objects may appear to slide over the virtual set as the camera pans or zooms.

At the processing stage 55 of the presentation engine, the values of the camera instrumentation data 12 may be used by the Camera Viewpoint node 50 used to drive a virtual camera. The Camera Viewpoint node 50 does not render or produce the graphics. A rendering engine produces the graphics using the Camera Viewpoint node 50. The virtual camera 51 is used in rendering a virtual scene 59 and graphics 52 of the appropriate size and at the appropriate position corresponding to the real camera's view point for that frame. The value corresponding to the viewpoint of the real camera and the lens distortion values of the real camera are passed as parameters to the corresponding fields of the Camera Viewpoint node and used to drive the virtual camera's viewpoint to correspond to that of the real camera. Alternatively, a dataReader node accepts the camera instrumentation data and passes the appropriate parameters to the viewpoint node that corresponds the virtual camera's 51 viewpoint to that of the real camera 10. A viewpoint is a predefined viewing position and orientation in a virtual or real world, like a recommended photograph location at a tourist attraction. The location and viewing direction for the viewpoint is specified by the parameters of the viewpoint node or the Camera Viewpoint node.

In the preferred embodiment, a node named Gridnode 54 is developed to correct distortions introduced by the real camera lens. The Gridnode 54 uses camera instrumentation data 12 to correct for the radial lens distortion and optical center shift of the real camera lens. This correction is needed because in order to do frame aligned graphics insertion, it is necessary to correct for the effects of radial lens distortion and optical center shift inherent in every real camera. Otherwise, the inserted graphics would not accurately register to the to the real object and would appear to shift with respect to it.

The video feed 53 is used by the VideoSurface node 56 to render the real scene as texture for that particular frame, as shown in video surface scene 60. Some declarative markup languages including VRML supports a MovieTexture primitive for presenting video clips, but streaming video feed from a broadcast is not directly supported. In one embodiment, a new level of abstraction to support video synthesis, called surfaces, has been introduced. By using this abstraction, the presentation engine 34 architecture enables arbitrary marking engines (e.g., video, HTML, Flash) to render into a scene at appropriate frame rate without burdening other elements (e.g., a 5 frames/sec animation on one surface would not prevent video on another surface from playing at 30 fps). In one example, a MovieSurface node is introduced and used to control and display video. A subclass of the MovieSurface node named VideoSurface is used to implement the processing of live or streaming video feed such as the DTV broadcast of the racing event of present example. The VideoSurface node includes fields that support a broadcast or live video feed as opposed to a locally stored video. An example of the VideoSurface node is shown as follows:

```
VideoSurface {
    field SFString VideoSource "ATSC"
    field SFVec2f VideoResolution 720 480
}
```

The VideoSource field indicates where the presentation engine browser is receiving video input. The possible values of the field are hardware dependent. For the particular platform illustrated in the example, there are three possibilities: ATSC, COMPOSITE, and SDI (Serial Digital Interface). In the case of ATSC, the decoded video is extracted directly from a receiver/tuner card and displayed onto the surface. In this configuration it is assumed that the presentation engine's 34 browser and the DTV receiver reside in the same machine or set top box 24. Alternatively, a two-box setup may be added in which the first box is a DTV receiver 24 and the second box holds the presentation engine 34. The decoded video stream is sent from the DTV receiver to the compositor via either the COMPOSITE video port or the SDI video port.

The VideoResolution field specifies the dimensions of the extracted video. In this example, the presentation engine has the capability of handling full-sized NTSC video of 720× 480 at 30 fps. The ATSC tuner card is able to down filter any of the ATSC video resolutions to 720×480.

At the output stage 57 of the presentation engine 34, the camera Viewpoint node 50 is used to drive the virtual camera 51 and is used by a rendering engine not shown here to produce the add-on graphics 52 within a virtual scene 59, to be inserted into the streaming video feed as shown in 62. The Gridnode node 54 uses a distortion grid 58 to modify the rendered graphics 52 by adjusting them so that the rendered graphics 52 are distorted in the same way as the real scene 60. The presentation engine 34 then composites the corrected add-on graphics 59 with the real scene 60 to form the composite scene 62 which is then displayed on the DTV screen 36.

In one embodiment, add-on graphics may be corrected for the distortion of the real camera using a distortion grid 58. The distortion grid 58 is used as form geometry or upon which the add-on graphics 52 are laid out. The coordinates of the distortion grid 58 are adjusted based on the distortion parameters of the real camera lens 58 corresponding to each frame. The rendered graphics are laid on the distortion grid 58 and distorted in the appropriate amount corresponding to the distortion parameters of the real camera lens. In the present example, the distortion grid 58 is adjusted for changes in the distortion parameters by correspondingly adjusting its coordinates. The distortion grid 58 introduces appropriate distortion into the virtual scene surface 59 and the add-on graphics 52 when the virtual scene is laid on it and the distortion grid 58 is used as from or geometry to distort the virtual scene 59 and the rendered graphics 52 in it.

Figure 5:
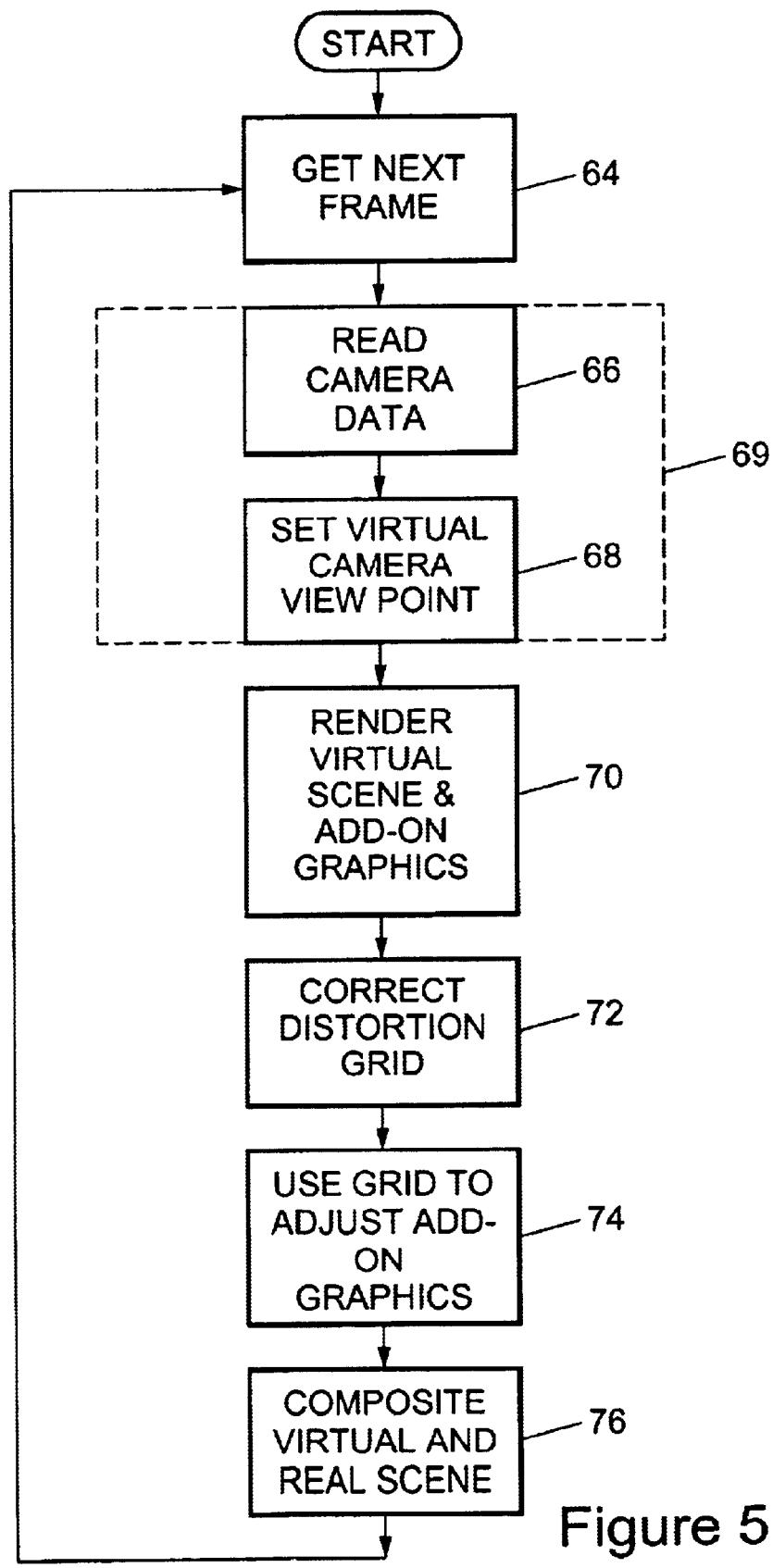
FIG. 5 illustrates a flow diagram of the operation of the presentation engine.

FIG. 5 is a flow diagram of one embodiment for the operation of the presentation engine 34. Initially, the next frame of the incoming video stream is received at block 64. At block 66, the camera sensor data 12 is read. The camera sensor data 12 may include some or all the variables for camera position, orientation, field of view (fov), pan, tilt, zoom, optical center shift in the x-direction (su), optical center shift in the y-direction (sv) and the coefficient of distortion. At block 68, the virtual camera's viewpoint is set to correspond to that of the real camera using the viewpoint node. A viewpoint is a predefined viewing position and orientation in the virtual world, like a recommended photograph location at a tourist attraction. The blocks 66 and 68 are combined into a block 69 for rendering the camera data and setting the virtual camera viewpoint. Using the position, orientation and field of view variables, the viewpoint node is used to render the virtual scene 70.

In one embodiment, the functionality of the data read block 66 and block 68 may be combined and handled by the Camera Viewpoint node. An example of the camera viewpoint node is as follows:

```
Camera Viewpoint {
    fieldOfView  0.635262
    field SFVec3f distort 0.2 0.1 0.000194
    description "Main View"
}
```

The CameraViewpoint node uses the parameter passed to it in the fieldOfView field and the parameters passed to it in the distort field to render a virtual scene 53 (FIG. 4) including the add-on graphics corresponding to the real camera's field of view and position. The scene 58 that gets rendered onto the IndexedFaceSet of the Gridnode uses the Camera Viewpoint node.

Camera Viewpoint is able to accept camera data (the data is getting collected and routed to the Camera Viewpoint node using a DataHandler node described below) to adjust the virtual camera in position, field of view, etc., corresponding to the real camera instrumentation data. The distort parameter that is passed onto the Gridnode node holds the optical center shift in the x and y directions and the first order radial lens distortion parameter of the real camera lens. A 3-dimensional vector is used here to simplify parameter passing. The file containing the graphic objects to be inserted with CameraViewpoint node gets updated by tracking data from the appropriate real camera.

While declarative markup languages such as VRML provide an event model that enable triggering media events based on signals, there is no data architecture built into these languages beyond some simple field types. The method and apparatus of the present example includes a data architecture using MPEG-2 as a delivery mechanism, in order to be in step with emerging digital broadcasting standards. Furthermore, since the example of the present embodiment of the present invention uses Hauppauge ATSC video boards that decode MPEG-2, the extended VRML language uses MPEG-2 to display the scene using the videoSurface node. The videoSurface node grabs a decoded frame from memory and puts it into the presentation engine 34. The frame in memory has already been decoded by the hardware of the ATSC board. It is well understood by persons skilled in the art that the techniques of the present invention may equally apply to other standards as well.

Current digital television broadcast services, whether satellite, cable, or over-the-air, are based on the MPEG-2 standard. In addition to specifying audio and video encoding, MPEG-2 defines a transport stream format consisting of a multiplex of elementary streams. The elementary streams may be compressed audio or video data, information about the structure of the transport stream, and arbitrary data. Standards such as DSM-CC and ATSC data broadcast standard give ways of placing IP datagrams in elementary data streams.

For this reason, in one embodiment, a top-level extension node is created for handling the ATSC data stack called ATSC_DataHandler with the following exemplary interface:

```
ATSC_DataHandler {
    field MRInt32 pid  [1, 1, 2]
    field MRString type ["INSTANTANEOUS", "CONTINUOUS",
                                           "CAROUSEL"]
    field MRBool active [TRUE, TRUE, TRUE}
}.
```

Referencing an elementary data stream is done through the Program Identification Data field (PID). A DTV receiver should have the ability to filter out any unwanted data streams and only process those data streams indicated in the PID field with the active field set to TRUE. Furthermore, three types of data streams have been defined and classified: instantaneous stream, continuous stream, and carouselling stream. Instantaneous stream contains data that occurs sporadically. One example is the polling scenario where the broadcaster can insert trivia or polling questions anytime during the program. Typically, this type of data will contain a Presentation Time Stamp (PTS) so that the compositor can use this information to present the data at the appropriate time during the broadcast. On the other hand, a continuous stream contains data that is updated throughout the entire program. Examples include camera tracking data and car position/telemetry data. For this type of stream, synchronization with the broadcast video is usually done via the timecode information. Finally, carousel data stream has been defined. Data contained in the carousel are looped repeatedly during the broadcast. For example, in motor sports, statistical data (e.g. current standings, current lag, etc.) can be carouseled so viewers who tuned in during the middle of the broadcast can access this information at the next carousel cycle. Also, part of the graphical user interface (GUI) can be placed in the carousel.

Figure 7:
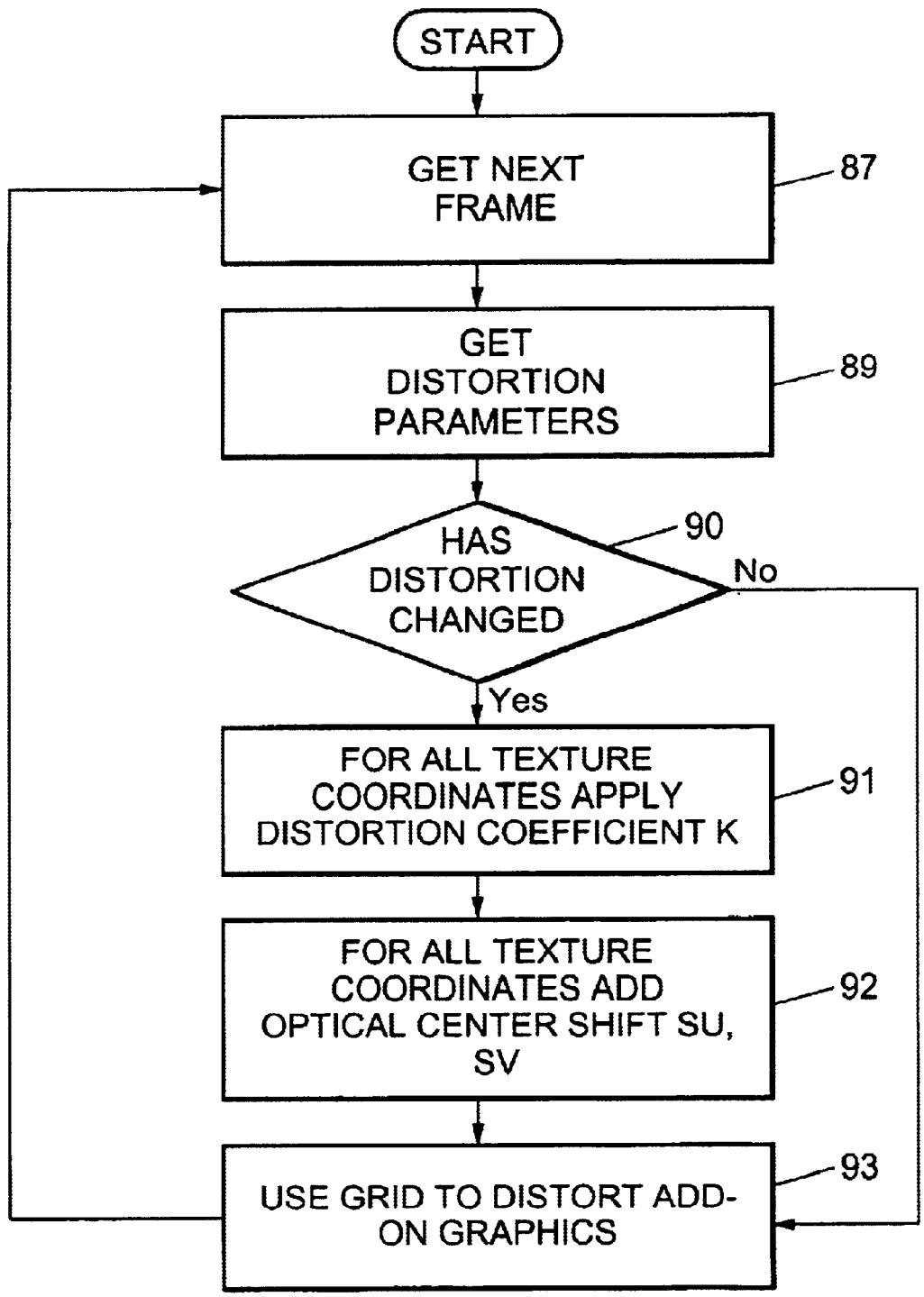
FIG. 7 is the flow diagram of the distortion correction operation.

Referring again to FIG. 5, at block 72, after the CameraViewpoint 50 is used to render the virtual scene 52, the Gridnode node parameters are used to correct the coordinates of the grid 58 of FIG. 4 block 72 is described in more details in FIG. 7.

At block 74, the grid 58 is used by the presentation engine 34 as geometry for a shape node and applied to the virtual scene and the rendered add-on graphics. In a declarative markup language such as VRML, each shape has a form, or geometry, that defines its 3-D structure, and it has an appearance based on the material, a color like red or blue, from which it is made and its surface texture, like wood or brick. In VRML, these shape attributes geometry and appearance —are specified by field values within a shape node. The grid 58 is used as the geometry upon which the add-on graphics is to be inserted and the video are composited as at block 76.

When introducing add-on graphics that have to be registered and correlated with objects in the video, correction for lens distortion and optical center shift becomes necessary. In one embodiment a correction technique is applied based on the techniques of rectification and geometric correction which are normally applied on a per-image basis. The present invention introduces a two-pass rendering technique that renders the scene that is to be used as a texture in the second pass. This texture is then corrected for distortion parameters (radial distortion and optical center shift), and finally composited with the current video image. Some current virtual set systems perform this correction since it becomes especially important if one has, for example, real objects sitting on virtual objects. Without lens distortion correction, real objects can appear to slide over the virtual set as the camera pans or zooms. The method and apparatus of the present example includes a Gridnode node that uses camera instrumentation data to correct for the real camera lens distortion and optical center shift. An example of a Gridnode node is shown as follows:

```
Gridnode {
    field SFVec2f dimension 10 10
    field SFVec3f distort 0 0 0
}
```

Parameterized Gridnode allows for declarative representation of the real camera distortion. In the present embodiment of the invention, Gridnode is introduced as an extension to a declarative markup language such as VRML, and includes a distort field that accepts distortion parameters corresponding to the real camera's x-axis and y-axis optical center shift and the radial lens distortion. The Gridnode node renders a distortion grid 58 (shown in FIG. 4) as a texture whose coordinates are based on the distortion parameter values passed to it. The Gridnode's texture coordinates are adjusted to correct for the optical center shift and the radial lens distortion. The final texture will be composited (overlaid) on the video feed. In one embodiment, wherein the declarative markup language is VRML, the Gridnode may be derived from GeometryNode, and it allows the integration of camera tracking data in VRML syntax. The field distort at the beginning of the video file uses a ROUTE statement (FROM) to access the distort field of a real camera. This in turn allows this field to be accessed when the video file is instantiated. In this case the field is accessed to route the data to the Gridnode.

Figure 6:
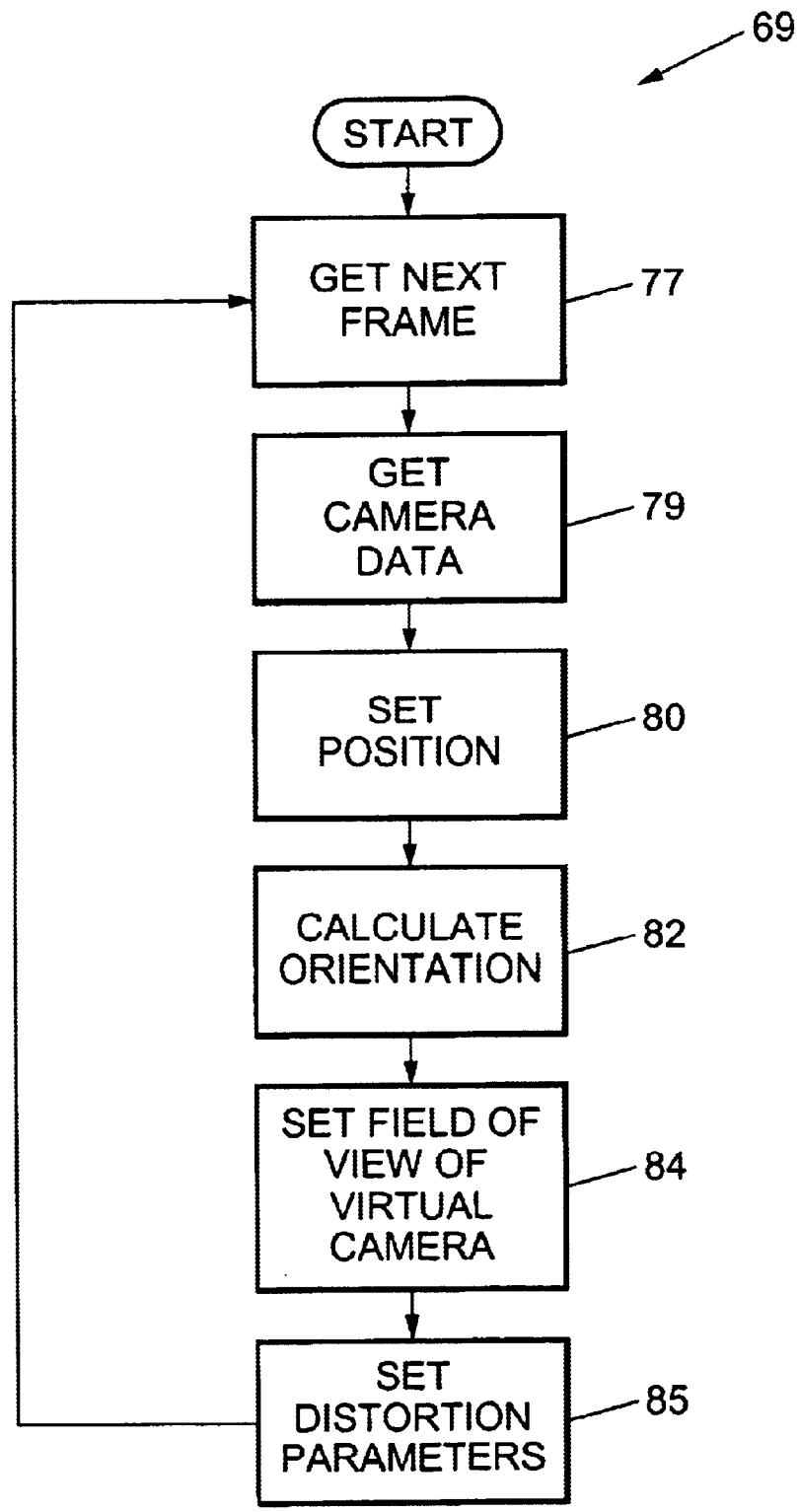
FIG. 6 illustrates a detailed flow diagram of the operations in rendering add-on graphics in a virtual scene.

FIG. 6 is a flow diagram of one embodiment for rendering add-on graphics in a virtual scene. The distortion correction process starts by getting the next frame of the streaming video at block 77. In one embodiment, the real camera tracking data 12 corresponding to a particular frame of the streaming incoming video is passed onto the dataReader node at block 66. This data is passed on to the Gridnode at block 79. At block 80, using the viewpoint node or in an alternative embodiment using the Camera Viewpoint node, the virtual camera's position is correlated to that of the real camera 10 based on the incoming real camera instrumentation data 12. At block 82, based on the pan, tilt and twist of the real camera 10, the orientation of the virtual camera 51 is calculated. At block 84, the field of view of the virtual camera is set to correspond to that of the real camera 10. Block 84, only sets the distort field at this point, but does not correct it. At block 85, the distortion parameters for the virtual scene 59 are set. At block, the virtual camera 51 (as shown in FIG. 4) is used to render the virtual scene including the add-on graphics to be inserted in the real video frame. The size and position of the rendered graphics corresponds to the corresponding real camera 10. In an alternative embodiment, a Camera Viewpoint node is used to perform blocks 77–85 performed by the dataReader node and the viewpoint node. In this alternative embodiment, the operations of rendering a virtual scene and add-on graphics would be identical to what is depicted in FIG. 6, but the code used to implement and integrate the Camera Viewpoint node into the declarative markup language may be different.

In one embodiment, a two-pass rendering technique is used to render the scene that is to be used as a texture in a second pass. The rendered graphics needs to be corrected to match the distortion of the real camera. This texture is then corrected for distortion parameters (radial distortion and optical center shift) and finally composited with the current video image.

FIG. 7 is a flow diagram of one embodiment for a distortion correction operation. Initially at block 87, the parameter for the distortion field including the radial lens distortion parameter (k), and the optical center shift in the x and y direction (su, sv) are passed to the system. At block 89, the distortion parameters corresponding to the next frame of the streaming video feed is received. At block 90, the distortion parameters of the new frame are compared to the distortion parameters of the previous frame. If the distortion parameters have not changed, the process jumps to block 93 wherein the grid is used to distort this next frame using the same parameters. If the distortion parameters have changed, the system proceeds to modify the distortion grid based on the new distortion parameters as shown in blocks 91-93. The distortion parameters for each frame of video may vary depending on the camera used for the shot as well as the zoom level used for the shot.

If the distortion parameters have changed at block 91, the distortion coefficient k is applied to all the texture coordinates of the distortion grid 58. It would be apparent to one skilled in the art that the methods of the present invention are equally applicable to multiple distortion coefficients, k1, k 2, . . . In an alternative embodiments, other measurement techniques yielding multiple distortion coefficients may equally be used. The multiple distortion coefficients may then be applied to the texture coordinates of the distortion grid 58. At block 92, the optical center shift in the x and y direction are added to all texture coordinates. At block 93, the newly adjusted grid texture is used as geometry in distorting the add-on graphics. The real camera's lens distortions are transferred onto the add-on graphics by using the grid geometry 58 to distort the add-on graphics to match the distortions of the real camera 10.

Figure 8:
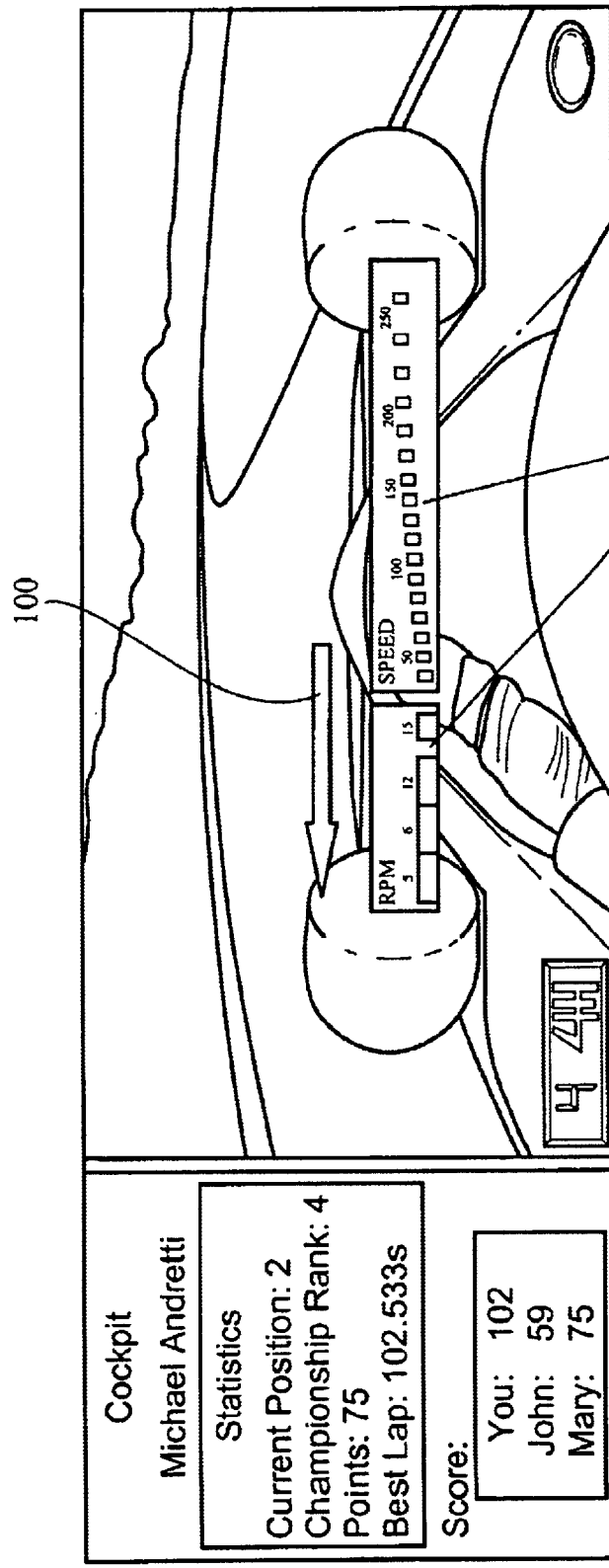
FIG. 8 is the screen shot of an illustrative example of the techniques of the present invention showing the Cockpit data of selected car.

FIG. 8 is an illustrative example of the Cockpit data of selected car on the display. Based on the user selection and the various sensor data, the presentation engine may display the cockpit information 98 of a selected driver and the acceleration direction on the car by displaying an arrow 100 in the right direction. Neither of these graphics need to be registered to the moving car and are simply overlaid on the displayed video surface.

Figure 9:
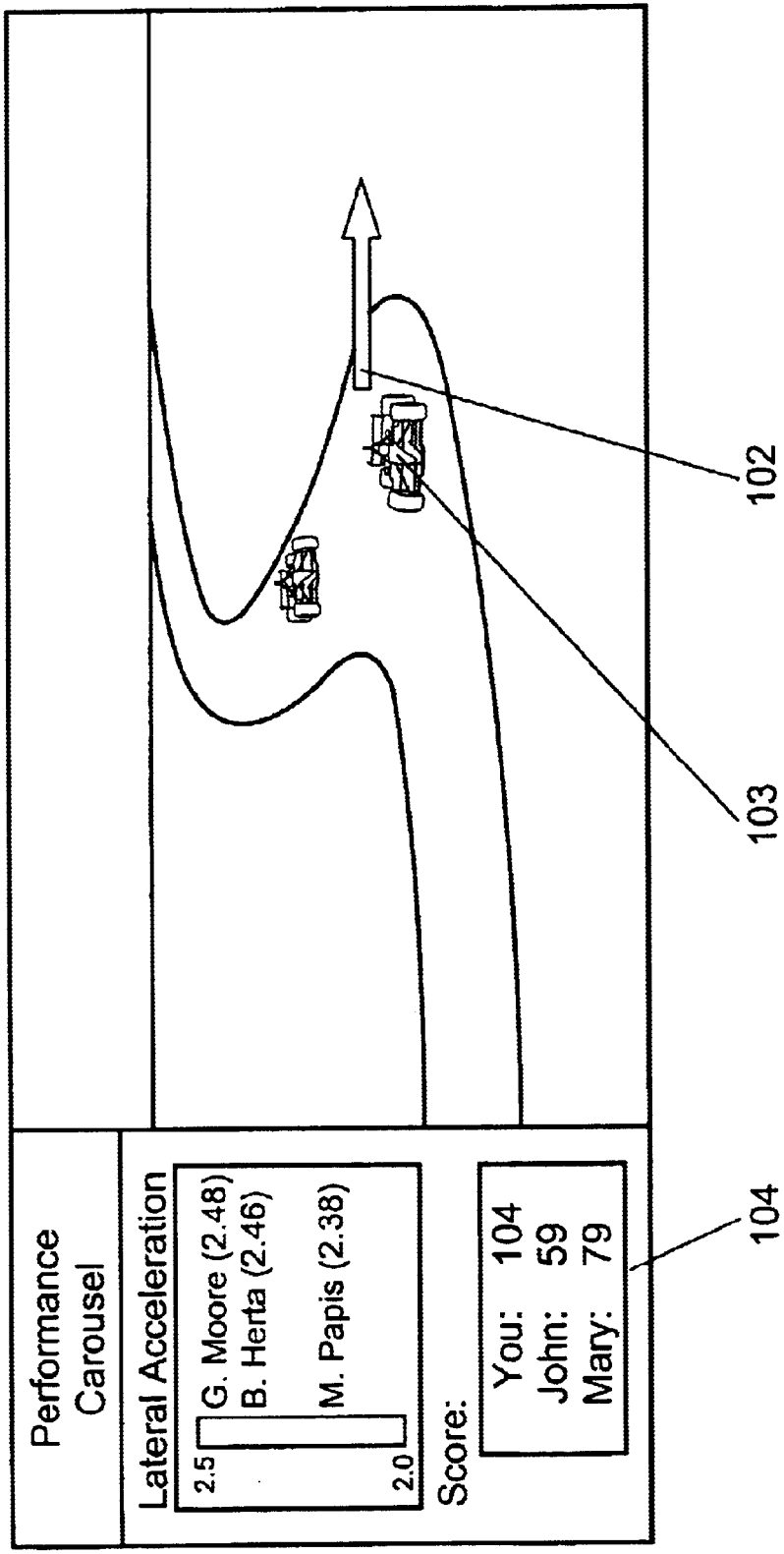
FIG. 9 is the screen shot of another illustrative example of the techniques of the present invention showing the performance carousel.

FIG. 9 is an illustrative example of the techniques showing a performance carousel on the display. In this example the arrow 102 showing the direction of the acceleration is registered to the user selected car and thus moves with it. At the same time information regarding the particular driver is compared to that of other drivers and is overlaid on the left hand window 104. The arrow 102 is rendered graphics that may need to be corrected for distortion. As the race car 103 moves around the track, the field of view of the real camera lens and its corresponding distortion parameters may change. Without distortion correction, the rendered graphics (the arrow 102 in this example) may appear to move with respect to the racecar 103 and not be properly register to the car.

Figure 10:
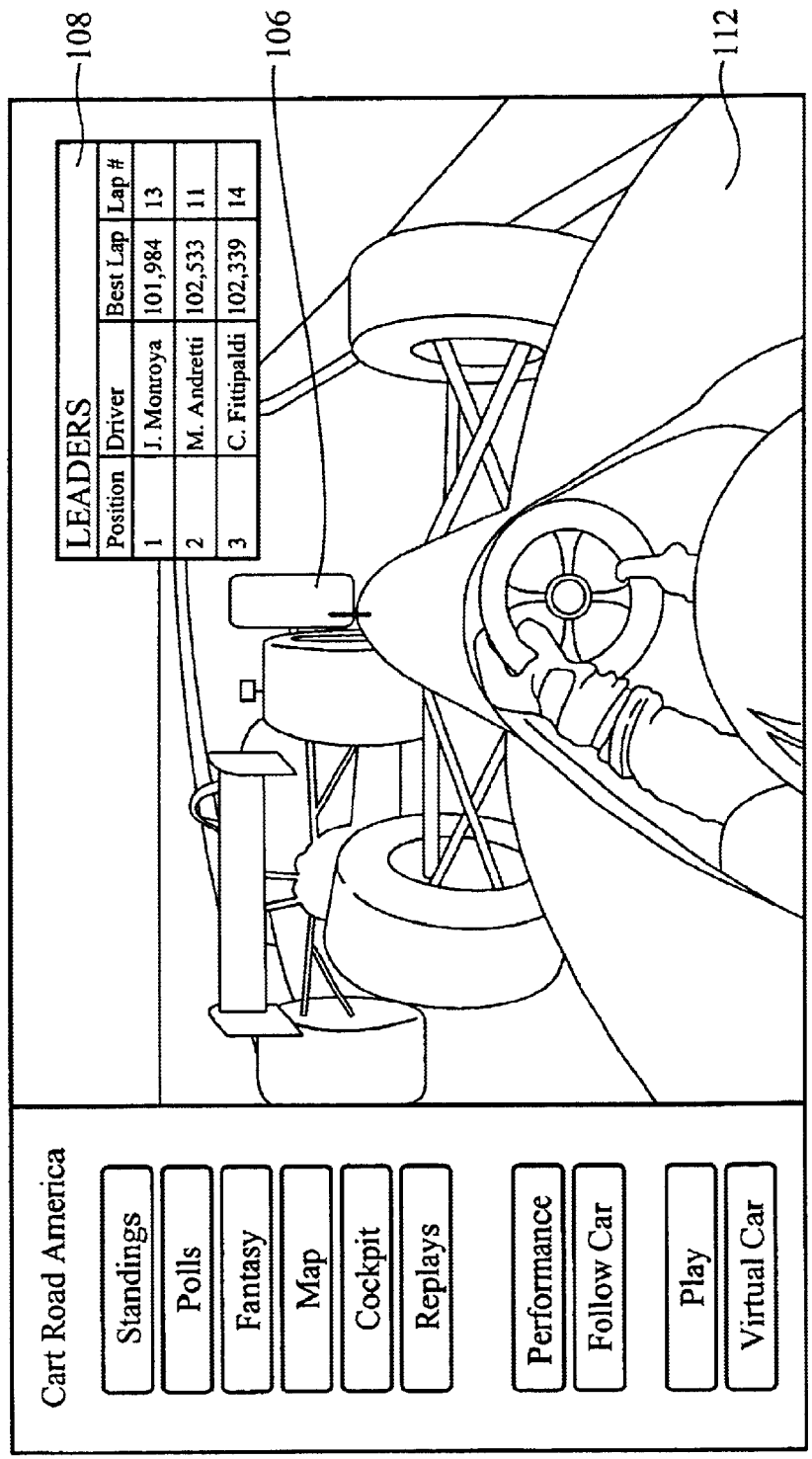
FIG. 10 is the screen shot of another illustrative example of the techniques of the present invention.

FIG. 10 is an illustrative example of the rendered display. In this example, a virtual car 106 is introduced in the race. Using the supplied data the user may race against the real cars and compare his performance to that of the real drivers 108. This is example illustrates the one of the many ways using the techniques of the embodiments presented here incorporate a gaming console and a stand alone receiver into one integrated unit. The virtual racecar 106 introduced into the real car race scene may need to be registered with respect to the real racecar 112. Distortion correction may be necessary to maintain proper registration of the virtual racecar 106 with respect to the real racecar 112.

The embodiments allow the instrumented camera information to be processed downstream on the user side, where the presentation engine renders the virtual scene based on the real camera instrumentation data. Downstream processing allows flexibility and possibility of user interactivity. However, the embodiments are equally applicable integration of graphics both on the broadcaster and/or on the receiver site.

Although the present invention has been described above with respect to the embodiments illustrated in simple schematic form, it is to be understood that various alterations and modifications thereof will become apparent to those skilled in the art. It is therefor intended that the appended claims to be interpreted as covering all such alterations and modifications as fall within the true spirit and scope of the invention.

What is claimed is:

1. A method of distorting add-on graphics to be composited with a streaming video feed comprising:
    receiving a streaming video feed captured using a real camera, said streaming video feed including an image frame taken from a particular view point and a particular field of view, said real camera introducing image distortions into the image frame;
    measuring a plurality of camera instrumentation data corresponding to at least said view point, said field of view, and distortion parameters corresponding to the image distortions of the image frame;
    creating a virtual camera;
    setting the virtual view point and the virtual field of view of the virtual camera using the plurality of camera instrumentation data;
    generating add-on graphics having a size and an insertion position within the image frame based on the virtual camera;
    creating a distortion grid;
    distorting the add-on graphics to match the image distortions of the image frame; and
    compositing the distorted add-on graphics with the image frame of the streaming video feed.

2. The method of claim 1 wherein the virtual camera renders the add-on graphics at a virtual view point and a virtual field of view corresponding to the view point and the field of view of the real camera.

3. The method of claim 1 wherein the size and the insertion position of the add-on graphics within the image frame corresponds to the size and the position of an image of a real asset within the image frame.

4. The method of claim 1 wherein the grid has a set of coordinate values based on the distortion parameters.

5. The method of claim 4 wherein distorting of the add-on graphics to match the image distortions of the image frame uses the set of coordinate values.

6. The method of claim 1 wherein the virtual camera is created using a declarative markup language.

7. The method of claim 6 wherein the declarative markup language is an extension of VRML.

8. The method of claim 6 wherein the declarative markup language includes at least:
    a camera viewpoint node for receiving the camera instrumentation data used to drive the virtual camera.

9. The method of claim 8 wherein the camera view point node comprises at least one of:
    a first field for receiving and storing parameters corresponding to the field of view of the real camera;
    a distort field for receiving and storing distortion parameters corresponding to the radial lens distortions of the real camera; and
    a description field for receiving and storing data corresponding to the viewing direction of the real camera.

10. The method of claim 6 wherein the declarative markup language includes at least:
    a grid node for creating a distortion grid used as a form for distorting the add-on graphics.

11. The method of claim 10 wherein the form is adjusted to match the distortions parameters by adjusting the set of coordinate values.

12. The method of claim 10 wherein the grid node comprises at least one of:
    a dimension field for receiving the dimension of the image frame; and
    a distort field for receiving the distortion parameters corresponding to radial lens distortion values of the real camera.

13. The method of claim 12 wherein the distort field includes at least one of:
    a parameter representing the optical center shift of the real camera in an x direction;
    a parameter representing the optical center shift of the real camera in a y direction orthogonal to said x direction; and
    at least one parameter representing the radial distortion coefficient of the real camera.

14. The method of claim 6 wherein the declarative markup language includes:
    a first node for receiving the plurality of camera instrumentation data; and
    a second node for receiving data corresponding to the view point and field of view of the real camera, the data being used to set the virtual view point and the virtual field of view.

15. The method of claim 1 wherein the distortion grid is created using a declarative markup language.

16. The method of claim 15 wherein the declarative markup language is an extension of VRML.

17. The method of claim 15 wherein the declarative markup language includes at least:
a camera viewpoint node for receiving the camera instrumentation data used to drive the virtual camera.

18. The method of claim 17 wherein the camera viewpoint node comprises at least one of:
a first field for receiving and storing parameters corresponding to the field of view of the real camera;
a distort field for receiving and storing distortion parameters corresponding to the radial lens distortions of the real camera; and
a description field for receiving and storing data corresponding to the viewing direction of the real camera.

19. The method of claim 15 wherein the declarative markup language includes at least:
a grid node for creating a distortion grid used as a form for distorting the add-on graphics.

20. The method of claim 19 wherein the form is adjusted to match the distortions parameters by adjusting the set of coordinate values.

21. The method of claim 19 wherein the grid node comprises at least one of:
a dimension field for receiving the dimension of the image frame; and
a distort field for receiving the distortion parameters corresponding to radial lens distortion values of the real camera.

22. The method of claim 21 wherein the distort field includes at least one of:
a parameter representing the optical center shift of the real camera in an x direction;
a parameter representing the optical center shift of the real camera in a y direction orthogonal to said x direction; and
at least one parameter representing the radial distortion coefficient of the real camera.

23. The method of claim 15 wherein the declarative markup language includes:
a first node for receiving the plurality of camera instrumentation data; and
a second node for receiving data corresponding to the view point and field of view of the real camera, the data being used to set the virtual view point and the virtual field of view.

24. The method of claim 1 wherein the camera instrumentation data from the corresponding real camera includes parameter values for at least one of:
pan, tilt, twist, zoom level and image distortion parameters.

25. The method of claim 1 wherein the image distortion parameters include at least one of:
radial lens distortion and optical center shift in x and y direction.

26. A computer program product embodied in a computer readable medium for distorting add-on graphics to be composited with a streaming video feed comprising:
code means for receiving a streaming video feed captured using a real camera, said streaming video feed including an image frame taken from a particular view point and a particular field of view, said real camera introducing image distortions into the image frame;
code means for measuring a plurality of camera instrumentation data corresponding to at least said view point, said field of view, and a distortion parameters corresponding to the image distortions of the image frame; code means for creating a virtual camera;
code means for setting the virtual view point and the virtual field of view of the virtual camera using the plurality of camera instrumentation data;
code means for generating add-on graphics having a size and an insertion position within the image frame based on the virtual camera;
code means for creating a distortion grid;
code means for distorting the add-on graphics to match the image distortions of the image frame; and
code means for compositing the distorted add-on graphics with the image frame of the streaming video feed.

27. The computer program product of claim 26 wherein the virtual camera renders the add-on graphics at a virtual view point and a virtual field of view corresponding to the view point and the field of view of the real camera.

28. The computer program product of claim 26 wherein the size and the insertion position of the add-on graphics within the image frame corresponds to the size and the position of an image of a real asset within the image frame.

29. The computer program product of claim 26 wherein the grid has a set of coordinate values based on the distortion parameters.

30. The computer program product of claim 29 wherein distorting of the add-on graphics to match the image distortions of the image frame uses the set of coordinate values.

31. The computer program product of claim 26 wherein the virtual camera is created using a declarative markup language.

32. The computer program product of claim 31 wherein the declarative markup language is an extension of VRML.

33. The computer program product of claim 31 wherein the declarative markup language includes at least:
code means for a camera viewpoint node for receiving the camera instrumentation data used to drive the virtual camera.

34. The computer program product of claim 33 wherein the camera view point node comprises at least one of:
code means for a first field for receiving and storing parameters corresponding to the field of view of the real camera;
code means for a distort field for receiving and storing distortion parameters corresponding to the radial lens distortions of the real camera; and
code means for a description field for receiving and storing data corresponding to the viewing direction of the real camera.

35. The computer program product of claim 31 wherein the declarative markup language includes at least:
code means for a grid node for creating a distortion grid used as a form for distorting the add-on graphics.

36. The computer program product of claim 35 wherein the form is adjusted to match the distortions parameters by adjusting the set of coordinate values.

37. The computer program product of claim 35 wherein the grid node comprises at least one of:
code means for a dimension field for receiving the dimension of the image frame; and
code means for a distort field for receiving the distortion parameters corresponding to radial lens distortion values of the real camera.

38. The computer program product of claim 37 wherein the distort field includes at least one of:
code means for a parameter representing the optical center shift of the real camera in an x direction;

code means for a parameter representing the optical center shift of the real camera in a y direction orthogonal to said x direction; and code means for at least one parameter representing the radial distortion coefficient of the real camera.

39. The computer program product of claim 31 wherein the declarative markup language includes:

code means for a first node for receiving the plurality of camera instrumentation data; and code means for a second node for receiving data corresponding to the view point and field of view of the real camera, the data being used to set the virtual view point and the virtual field of view.

40. The computer program product of claim 26 wherein the distortion grid is created using a declarative markup language.

41. The computer program product of claim 40 wherein the declarative markup language is an extension of VRML.

42. The computer program product of claim 40 wherein the declarative markup language includes at least:

code means for a camera viewpoint node for receiving the camera instrumentation data used to drive the virtual camera.

43. The computer program product of claim 42 wherein the camera viewpoint node comprises at least one of:

code means for a first field for receiving and storing parameters corresponding to the field of view of the real camera;

code means for a distort field for receiving and storing distortion parameters corresponding to the radial lens distortions of the real camera; and code means for a description field for receiving and storing data corresponding to the viewing direction of the real camera.

44. The computer program product of claim 40 wherein the declarative markup language includes at least:

code means for a grid node for creating a distortion grid used as a form for distorting the add-on graphics.

45. The computer program product of claim 44 wherein the form is adjusted to match the distortions parameters by adjusting the set of coordinate values.

46. The computer program product of claim 44 wherein the grid node comprises at least one of:

code means for a dimension field for receiving the dimension of the image frame; and code means for a distort field for receiving the distortion parameters corresponding to radial lens distortion values of the real camera.

47. The computer program product of claim 46 wherein the distort field includes at least one of:

code means for a parameter representing the optical center shift of the real camera in an x direction;

code means for a parameter representing the optical center shift of the real camera in a y direction orthogonal to said x direction; and code means for at least one parameter representing the radial distortion coefficient of the real camera.

48. The computer program product of claim 40 wherein the declarative markup language includes:

code means for a first node for receiving the plurality of camera instrumentation data; and code means for a second node for receiving data corresponding to the view point and field of view of the real camera, the data being used to set the virtual view point and the virtual field of view.

49. The computer program product of claim 26 wherein the camera instrumentation data from the corresponding real camera includes parameter values for at least one of:

pan, tilt, twist, zoom level and image distortion parameters.

50. The computer program product of claim 26 wherein the image distortion parameters include at least one of:

radial lens distortion and optical center shift in x and y direction.

51. An apparatus of distorting add-on graphics to be composited with a streaming video feed comprising:

means for receiving a streaming video feed captured using a real camera, said streaming video feed including an image frame taken from a particular view point and a particular field of view, said real camera introducing image distortions into the image frame;

means for measuring a plurality of camera instrumentation data corresponding to at least said view point, said field of view, and a distortion parameters corresponding to the image distortions of the image frame;

means for creating a virtual camera;

means for setting the virtual view point and the virtual field of view of the virtual camera using the plurality of camera instrumentation data;

means for generating add-on graphics having a size and an insertion position within the image frame based on the virtual camera;

means for creating a distortion grid;

means for distorting the add-on graphics to match the image distortions of the image frame; and means for compositing the distorted add-on graphics with the image frame of the streaming video feed.

52. The apparatus of claim 51 wherein the virtual camera renders the add-on graphics at a virtual view point and a virtual field of view corresponding to the view point and the field of view of the real camera.

53. The apparatus of claim 51 wherein the size and the insertion position of the add-on graphics within the image frame corresponds to the size and the position of an image of a real asset within the image frame.

54. The apparatus of claim 51 wherein the grid has a set of coordinate values based on the distortion parameters.

55. The apparatus of claim 54 wherein distorting of the add-on graphics to match the image distortions of the image frame uses the set of coordinate values.

56. The apparatus of claim 51 wherein the virtual camera is created using a declarative markup language.

57. The apparatus of claim 56 wherein the declarative markup language is an extension of VRML.

58. The apparatus of claim 56 wherein the declarative markup language includes at least:

a camera viewpoint node for receiving the camera instrumentation data used to drive the virtual camera.

59. The apparatus of claim 58 wherein the camera view point node comprises at least one of:

a first field for receiving and storing parameters corresponding to the field of view of the real camera;

a distort field for receiving and storing distortion parameters corresponding to the radial lens distortions of the real camera; and a description field for receiving and storing data corresponding to the viewing direction of the real camera.

60. The apparatus of claim 56 wherein the declarative markup language includes at least:

a grid node for creating a distortion grid used as a form for distorting the add-on graphics.

61. The apparatus of claim 60 wherein the form is adjusted to match the distortions parameters by adjusting the set of coordinate values.

62. The apparatus of claim 60 wherein the grid node comprises at least one of:
   a dimension field for receiving the dimension of the image frame; and
   a distort field for receiving the distortion parameters corresponding to radial lens distortion values of the real camera.

63. The apparatus of claim 62 wherein the distort field includes at least one of:
   a parameter representing the optical center shift of the real camera in an x direction;
   a parameter representing the optical center shift of the real camera in a y direction orthogonal to said x direction; and
   at least one parameter representing the radial distortion coefficient of the real camera.

64. The apparatus of claim 56 wherein the declarative markup language includes;
   a first node for receiving the plurality of camera instrumentation data; and
   a second node for receiving data corresponding to the view point and field of view of the real camera, the data being used to set the virtual view point and the virtual field of view.

65. The apparatus of claim 51 wherein the distortion grid is created using a declarative markup language.

66. The apparatus of claim 65 wherein the declarative markup language is an extension of VRML.

67. The apparatus of claim 65 wherein the declarative markup language includes at least:
   a camera viewpoint node for receiving the camera instrumentation data used to drive the virtual camera.

68. The apparatus of claim 67 wherein the camera viewpoint node comprises at least one of:
   a first field for receiving and storing parameters corresponding to the field of view of the real camera;
   a distort field for receiving and storing distortion parameters corresponding to the radial lens distortions of the real camera; and
   a description field for receiving and storing data corresponding to the viewing direction of the real camera.

69. The apparatus of claim 65 wherein the declarative markup language includes at least:
   a grid node for creating a distortion grid used as a form for distorting the add-on graphics.

70. The apparatus of claim 69 wherein the form is adjusted to match the distortions parameters by adjusting the set of coordinate values.

71. The apparatus of claim 69 wherein the grid node comprises at least one of:
   a dimension field for receiving the dimension of the image frame; and
   a distort field for receiving the distortion parameters corresponding to radial lens distortion values of the real camera.

72. The apparatus of claim 71 wherein the distort field includes at least one of:
   a parameter representing the optical center shift of the real camera in an x direction;
   a parameter representing the optical center shift of the real camera in a y direction orthogonal to said x direction; and
   at least one parameter representing the radial distortion coefficient of the real camera.

73. The apparatus of claim 65 wherein the declarative markup language includes:
   a first node for receiving the plurality of camera instrumentation data; and
   a second node for receiving data corresponding to the view point and field of view of the real camera, the data being used to set the virtual view point and the virtual field of view.

74. The apparatus of claim 51 wherein the camera instrumentation data from the corresponding real camera includes parameter values for at least one of:
   pan, tilt, twist, zoom level and image distortion parameters.

75. The apparatus of claim 51 wherein the image distortion parameters include at least one of:
   radial lens distortion and optical center shift in x and y direction.

76. A system for creating add-on graphics into a streaming video feed comprising:
   means for generating a streaming video feed;
   means for collecting camera instrumentation data;
   means for transmitting the streaming video feed and the camera instrumentation data down to a receiver;
   means for receiving a streaming video feed captured using a real camera, said streaming video feed including an image frame taken from a particular view point and a particular field of view, said real camera introducing image distortions into the image frame;
   means for measuring a plurality of camera instrumentation data corresponding to at least said view point, said field of view, and a distortion parameters corresponding to the image distortions of the image frame;
   means for creating a virtual camera;
   means for setting the virtual view point and the virtual field of view of the virtual camera using the plurality of camera instrumentation data;
   means for generating add-on graphics having a size and an insertion position within the image frame based on the virtual camera;
   means for creating a distortion grid;
   means for distorting the add-on graphics to match the image distortions of the image frame; and
   means for compositing the distorted add-on graphics with the image frame of the streaming video feed.

77. A method of distorting add-on graphics to be composited with a streaming video feed comprising:
   receiving a streaming video feed captured using a real camera, said streaming video feed including an image frame taken from a particular view point and a particular field of view, said real camera introducing image distortions into the image frame;
   measuring a plurality of camera instrumentation data corresponding to at least said view point, said field of view, and a distortion parameters corresponding to the image distortions of the image frame;
   creating a virtual camera; using a declarative markup language, said virtual camera being used in generating add-on graphics having a size and an insertion position within the image frame, the virtual camera rendering the add-on graphics at a virtual view point and a virtual field of view corresponding to the view point and the field of view of the real camera, the size and the insertion position of the add-on graphics within the image frame corresponding to the size and the position of an image of a real asset within the image frame;

setting the virtual view point and the virtual field of view of the virtual camera using the plurality of camera instrumentation data;

creating a distortion grid using the declarative markup language, the grid having a set of coordinate values based on the distortion parameters;

distorting the add-on graphics to match the image distortions of the image frame using the set of coordinate values; and compositing the distorted add-on graphics with the image frame of the streaming video feed.

78. An apparatus of distorting add-on graphics to be composited with a streaming video feed comprising:

means for receiving a streaming video feed captured using a real camera, said streaming video feed including an image frame taken from a particular view point and a particular field of view, said real camera introducing image distortions into the image frame;

means for measuring a plurality of camera instrumentation data corresponding to at least said view point, said field of view, and a distortion parameters corresponding to the image distortions of the image frame;

means for creating a virtual camera; using a declarative markup language, said virtual camera being used in generating add-on graphics having a size and an insertion position within the image frame, the virtual camera rendering the add-on graphics at a virtual view point and a virtual field of view corresponding to the view point and the field of view of the real camera , the size and the insertion position of the add-on graphics within the image frame corresponding to the size and the position of an image of a real asset within the image frame;

means for setting the virtual view point and the virtual field of view of the virtual camera using the plurality of camera instrumentation data;

means for creating a distortion grid using the declarative markup language, the grid having a set of coordinate values based on the distortion parameters;

means for distorting the add-on graphics to match the image distortions of the image frame using the set of coordinate values; and means for compositing the distorted add-on graphics with the image frame of the streaming video feed.

79. A computer program product embodied in a computer readable medium for distorting add-on graphics to be composited with a streaming video feed comprising;

code means for receiving a streaming video feed captured using a real camera, said streaming video feed including an image frame taken from a particular view point and a particular field of view, said real camera introducing image distortions into the image frame;

code means for measuring a plurality of camera instrumentation data corresponding to at least said view point, said field of view, and a distortion parameters corresponding to the image distortions of the image frame;

code means for creating a virtual camera; using a declarative markup language, said virtual camera being used in generating add-on graphics having a size and an insertion position within the image frame, the virtual camera rendering the add-on graphics at a virtual view point and a virtual field of view corresponding to the view point and the field of view of the real camera, the size and the insertion position of the add-on graphics within the image frame corresponding to the size and the position of an image of a real asset within the image frame;

code means for setting the virtual view point and the virtual field of view of the virtual camera using the plurality of camera instrumentation data;

code means for creating a distortion grid using the declarative markup language, the grid having a set of coordinate values based on the distortion parameters;

code means for distorting the add-on graphics to match the image distortions of the image frame using the set of coordinate values; and code means for compositing the distorted add-on graphics with the image frame of the streaming video feed.

* * * * *